(12) United States Patent
Wilke et al.

(10) Patent No.: US 6,612,339 B1
(45) Date of Patent: Sep. 2, 2003

(54) PISTON WITH FLUID SEALING RIDGES

(75) Inventors: Westley J. Wilke, Lincoln Park, MI (US); Christopher J. Roberts, Novi, MI (US); Jeff King, Westland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/034,980

(22) Filed: Dec. 28, 2001

(51) Int. Cl.[7] ................................................ F16L 55/04
(52) U.S. Cl. ............................................. 138/31; 138/30
(58) Field of Search ....................................... 138/31, 30

(56) References Cited

U.S. PATENT DOCUMENTS

| | | | |
|---|---|---|---|
| 611,823 A | * 10/1898 | Steier | 138/31 |
| 2,780,504 A | 2/1957 | Russell | |
| 3,040,835 A | * 6/1962 | Ahnert | 138/31 |
| 3,198,213 A | * 8/1965 | Schindel | 138/31 |
| 3,224,464 A | 12/1965 | Schmiel | |
| 3,613,734 A | * 10/1971 | Elmer | 138/31 |
| 3,863,677 A | 2/1975 | Tarsha | |
| 4,351,869 A | 9/1982 | Cresap | |
| 4,432,883 A | 2/1984 | Denzine et al. | |
| 4,644,976 A | * 2/1987 | Peter et al. | 138/31 |
| 4,679,994 A | 7/1987 | Brown | |
| 4,689,098 A | 8/1987 | Gaughan | |
| 4,976,501 A | 12/1990 | Sivulka et al. | |
| 5,219,000 A | * 6/1993 | Chalasani et al. | 138/31 |
| 5,290,120 A | 3/1994 | Osterfeld et al. | |
| 5,311,910 A | 5/1994 | Hasegawa et al. | |
| 5,363,744 A | 11/1994 | Pichler | |
| 5,403,077 A | 4/1995 | Burgdorf et al. | |
| 5,484,194 A | 1/1996 | Reinartz et al. | |
| 5,492,202 A | 2/1996 | Drotar et al. | |
| 5,531,513 A | 7/1996 | Tackett | |
| 5,540,486 A | 7/1996 | Linkner | |
| 5,992,948 A | 11/1999 | Gowda | |
| 6,042,200 A | 3/2000 | Hosoya et al. | |
| 6,065,814 A | 5/2000 | Nishii et al. | |
| 6,145,543 A | 11/2000 | Ohishi et al. | |
| 6,390,133 B1 | * 5/2002 | Patterson et al. | 138/31 |
| 6,539,976 B1 | * 4/2003 | Whiteside | 138/31 |

\* cited by examiner

Primary Examiner—James Hook
(74) Attorney, Agent, or Firm—MacMillan, Sobanski & Todd, LLC

(57) ABSTRACT

A piston for a low pressure fluid accumulator of a hydraulic control unit of a vehicle brake system includes a cylindrical body having an outer surface defining a first end surface of the piston. The first end surface includes a plurality of interconnected ridges. The ridges have outer surfaces and form cavities therebetween. Each ridge is adapted to provide a sealing surface between the first end surface of the piston and an inner surface of a fluid accumulator in which the piston may be inserted. In one embodiment of the invention, the closed end of the piston includes a thick self-supporting wall. A thin skirt extends from the thick self-supporting wall toward the open end of the piston. A plurality of axially extending skirt support ribs is formed on the inner surface of the piston skirt.

21 Claims, 3 Drawing Sheets

PISTON WITH FLUID SEALING RIDGES

BACKGROUND OF INVENTION

The present invention relates generally to a piston, and more particularly to a piston of an accumulator assembly for receiving and temporarily storing fluid.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spinout.

Generally, prior art anti-lock brake systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure through a control valve means to the associated brakes to prevent lockup of the controlled wheels. Typically, the anti-lock brake system includes means for cyclically reducing and reapplying pressure to the associated brakes to limit wheel slippage to a safe level while continuing to produce adequate brake torque to decelerate the vehicle as desired by the driver.

In controlling the application of pressure to selected wheel brakes, many systems utilize a low pressure accumulator which is operative to temporarily receive and store brake fluid during pressure reduction phases of the anti-lock operation.

SUMMARY OF THE INVENTION

The invention relates to a piston, especially a piston of a low pressure fluid accumulator of a hydraulic control unit of a vehicle brake system. The piston includes a cylindrical body having an outer surface defining a first end surface of the piston. The first end surface includes a plurality of interconnected ridges. The ridges have outer surfaces and form cavities therebetween. Each ridge is adapted to provide a sealing surface between the first end surface of the piston and an inner surface of a fluid accumulator in which the piston may be inserted.

In another embodiment of the invention the closed end of the piston includes a thick self-supporting wall. A thin skirt extends from the thick self-supporting wall toward the open end of the piston. A plurality of axially extending skirt support ribs is formed on the inner surface of the piston skirt.

In another embodiment of the invention the piston includes a substantially cup-shaped cylindrical body having an inner surface defining an axial bore. The axial bore extends from an open end of the piston body to a closed end of the piston body. An outer surface of the closed end defines a first end surface of the piston body. An annular boss is formed at a periphery of the first end surface. An annular ridge is formed centrally on the first end surface, and defines a central recess. The first end surface includes a plurality of ridges extending radially from the centrally formed annular ridge to the annular boss. Adjacent ridges define cavities therebetween.

Various objects and advantages of this invention will become apparent to those skilled in the art from the following detailed description of the preferred embodiment, when read in light of the accompanying drawings.

DETAILED DESCRIPTION OF THE INVENTION

Figure 3:
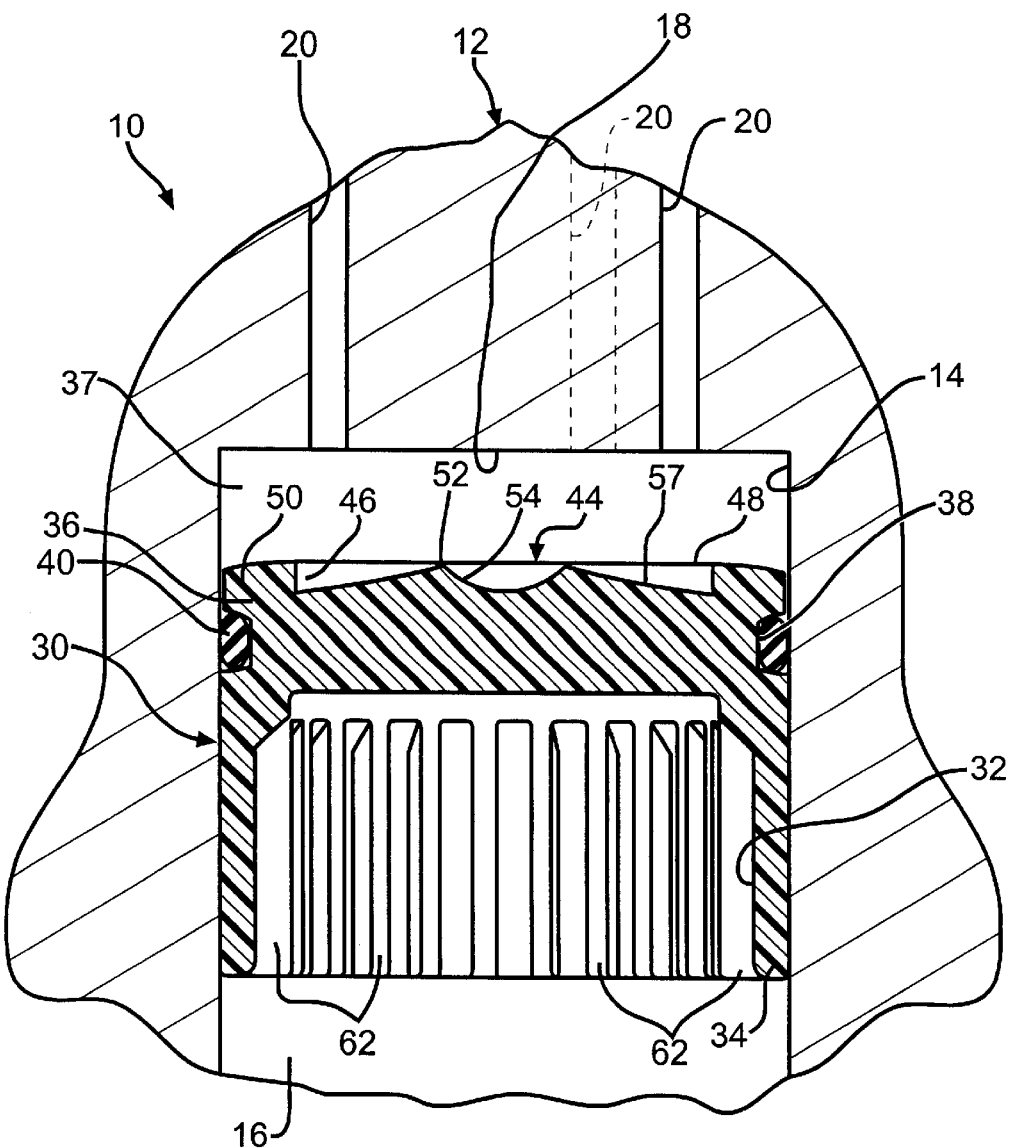
FIG. 3 is an elevational view in cross section of a low pressure accumulator according to this invention with the components of the accumulator shown in position before the expulsion of fluid from the accumulator reservoir.

Referring now to the drawings, there is illustrated in FIG. 3 a portion of a low pressure accumulator, generally shown at 10. The low pressure accumulator 10 includes a body 12. The body 12 typically forms a portion of a hydraulic control unit (HCU) of a brake system. The body 12 has an axial bore 14 extending from an open end 16 to a closed end 18. One or more conduits 20 pass through the closed end 18 to provide fluid communication between the bore 14 and the brake lines of the brake system in which the accumulator is installed.

A substantially cup-shaped cylindrical piston 30 has an inner surface defining an axial bore 32 extending from an open end 34 to a closed end 36 of the piston 30. The piston 30 is slidably received within the axial bore 14 of the body 12. The piston 30 and the accumulator body 12 cooperate to define an accumulator reservoir 37. A circumferential groove 38 is formed in an outer surface of the piston 30. An O-ring 40 is typically disposed within the groove 38 for fluidly sealing between the piston 30 and the inner surface of the body 12 defining the axial bore 14.

A retainer, such as an end cap (not shown) is typically mounted at the open end 16 of the accumulator body 12. The retainer prevents the piston 30 from being ejected from the axial bore 14. Typically, the retainer includes an elastomeric boot having a passageway, such as a narrow slit, for the passage of air to vent the adjacent portion of the axial bore 14 to the atmosphere.

A suitable spring, such as a helical compression spring (not shown) is typically disposed-between the closed end 36 of the piston 30 and, typically, the retainer. The spring urges the piston 30 relatively away from the retainer and toward the closed end 18 of the accumulator body 12.

Figure 1:
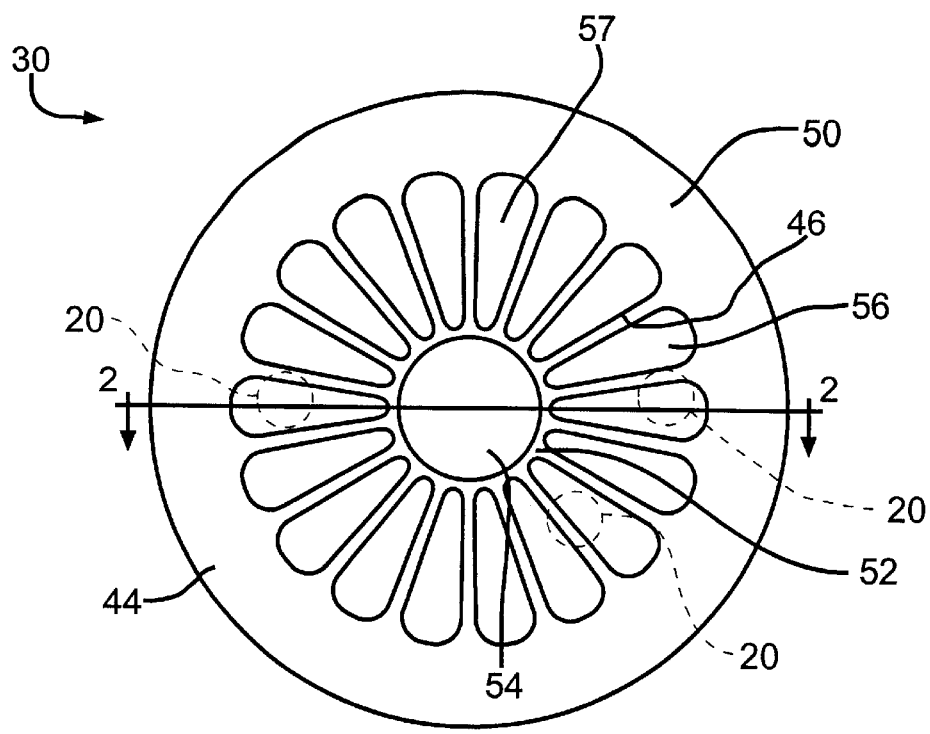
FIG. 1 is an end view of the piston according to the invention.
Figure 2:
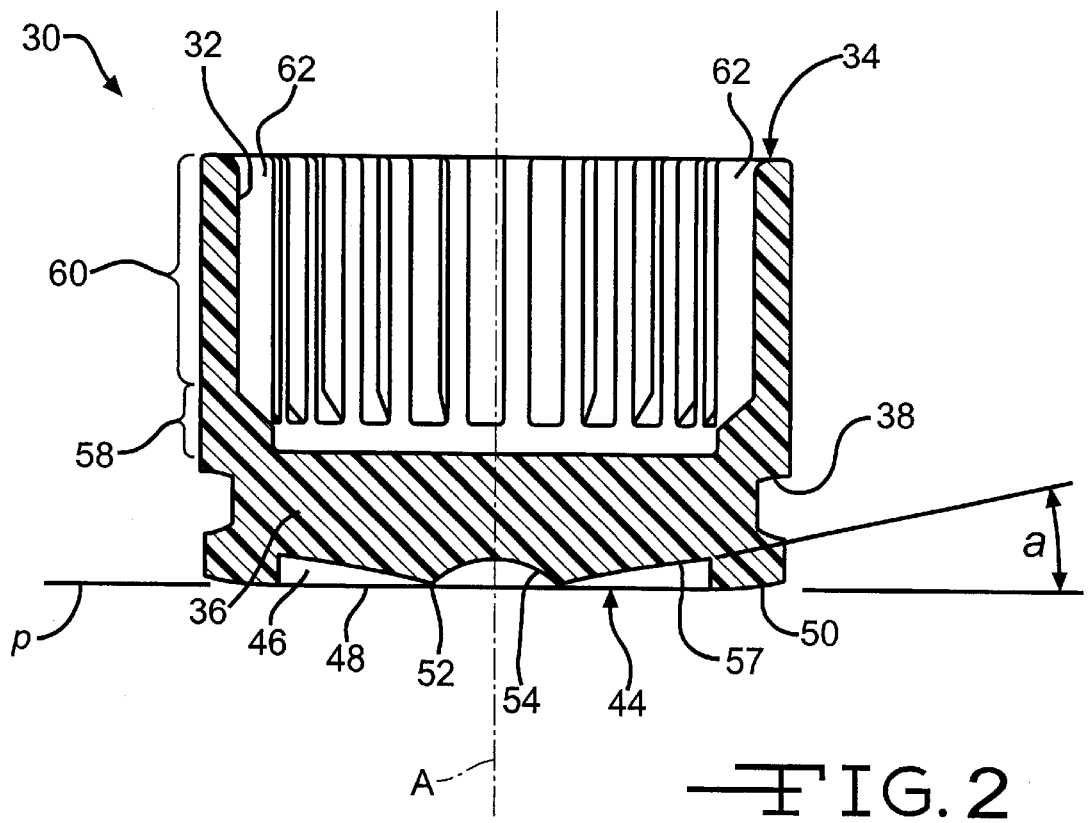
FIG. 2 is an elevational view in cross section of the piston taken along line 2—2 of FIG. 1.

Referring now also to FIGS. 1 and 2, the closed end 36 of the piston 30 includes an outer surface defining a first end surface 44. The first end surface 44 includes a plurality of interconnected ridges 46 having outer surfaces 48. Preferably, the piston 30 includes an annular ridge 50 formed at a periphery of the first end surface 44, and an annular ridge 52 formed centrally on the first end surface 44. The annular ridge 52 defines a central cavity or recess 54. Preferably, the central recess 54 has a concave shape. The ridges 46 extend radially from the centrally formed annular ridge 52 to the peripheral annular ridge 50. One or more of the adjacent ridges 46, and the annular ridges 50 and 52 cooperate to define substantially teardrop-shaped cavities 56 therebetween. It will be appreciated that the ridges 46 may cooperate to form cavities having other shapes, such as, for example, cavities having a substantially polygonal shape, a substantially circular shape, and a substantially ovaloid shape.

Preferably, the base of each cavity 56 has a substantially flat surface and extends outwardly from the annular ridge 50. Preferably, a base 57 of the each cavity 56 is at an angle a within the range of from about 9 degrees to about 11 degrees from a plane p defined by the coplanar outer edge surfaces 48 of the ridges 46. Preferably, the plane p is substantially perpendicular to a longitudinal axis A of the piston bore 32.

As shown in FIGS. 2 and 3, the outer surfaces 48 of the ridges 46 are substantially coplanar. The outer surfaces 48 of the ridges 46 provide a sealing surface between the outer surfaces 48 and the substantially planar surface of the closed end 18 of the accumulator body 12 when the piston 30 is positioned in contact with the closed end 18 of the accumulator body 12. The sealing surface thereby formed between the outer surfaces 48 and the closed end 18 of the accumulator body 12 thereby prevents fluid communication between the fluid conduits 20 through the axial bore 14 of the accumulator body 12.

Although the outer edge surfaces 48 have been described as being coplanar, it will be understood that the outer surfaces 48 of the ridges 46 may form any other shape such that the ridge outer surfaces 48 are congruous with a corresponding surface of the closed end 18 of the accumulator body 12. In other words, the piston 30 and the closed end 18 of the accumulator body 12 may be of any suitable shape to provide a sealing surface between the piston 30 and the closed end 18 of the accumulator body 12. Such a sealing surface is formed when the first end surface 44 of the piston 30 is positioned in contact with the closed end 18 of the accumulator body 12. The ridges 46 then cooperate with the surface of the closed end 18 of the accumulator body 12 to prevent fluid communication between at least one of the fluid conduits 20 and another of the fluid conduits 20 through the axial bore 14 of the accumulator body 12. For example, the ridge outer surfaces 48 may have a semi-spherical or dome shape corresponding to a concave closed end surface of the accumulator body 12.

The at least one conduit 20, described above, may communicate with one or more of the cavities 54 and 56 defined in the first end surface 44 of the piston 30. However, the adjacent ridges 46, 50, and 52 defining the cavity or cavities 54 and 56 seal against the closed end 18 of the accumulator body 12 to prevent communication with any other part of the axial bore 14 of the accumulator body 12. Communication between the at least one conduit 20 and the other conduits 20 is thus prevented by sealing the outer surfaces of the ridges 46, 50, and 52 against the closed end 18 of the accumulator body 12.

The piston 30 also includes a thick, self-supporting wall 58 adjacent the closed end 36 of the piston 30. A thin skirt 60 extends from the thick self-supporting wall 58 toward the open end 34 of the piston 30. A plurality of axially extending skirt support ribs 62 is formed on the inner surface 32 of the piston 30. The ribs 62 are equally spaced about the inner surface 32 of the piston 30. The ribs 62 provide strength to the piston 30 while allowing the piston skirt 60 to be manufactured with a thin wall relative to the thickness of the closed end 36 and the thick, self-supporting wall 58 of the piston 30. However, depending on the particular design objectives, it will be appreciated that satisfactory results may be achieved by pistons having other quantities and arrangements of ribs, and by pistons having no ribs.

The piston 30 may be fabricated in any conventional method, or combinations of methods, such as casting, stamping, machining, welding, cutting, etc. Preferably, the piston 30 is formed as a single-piece and molded in any suitable process, such as, for example, injection molding. The piston 30 may be formed from any suitable material, such as metals or ceramics. In a preferred embodiment, the piston 30 is formed of a suitable plastic, such as, for example polyphenylenesulphide (PPS).

Referring again to FIG. 3, the piston 30 is normally biased toward the closed end 18 of the accumulator body 12 by the compression spring so that the ridges 46 of the piston 30 engage the closed end 18 of the accumulator body 12. In the conventional manner, when the brake system enters the anti-lock mode and fluid is dumped into the accumulator reservoir 37 through at least one of the conduits 20, the piston 30 is displaced away from the closed end 18 of the accumulator body 12 and compresses the spring 42.

Figure 4:
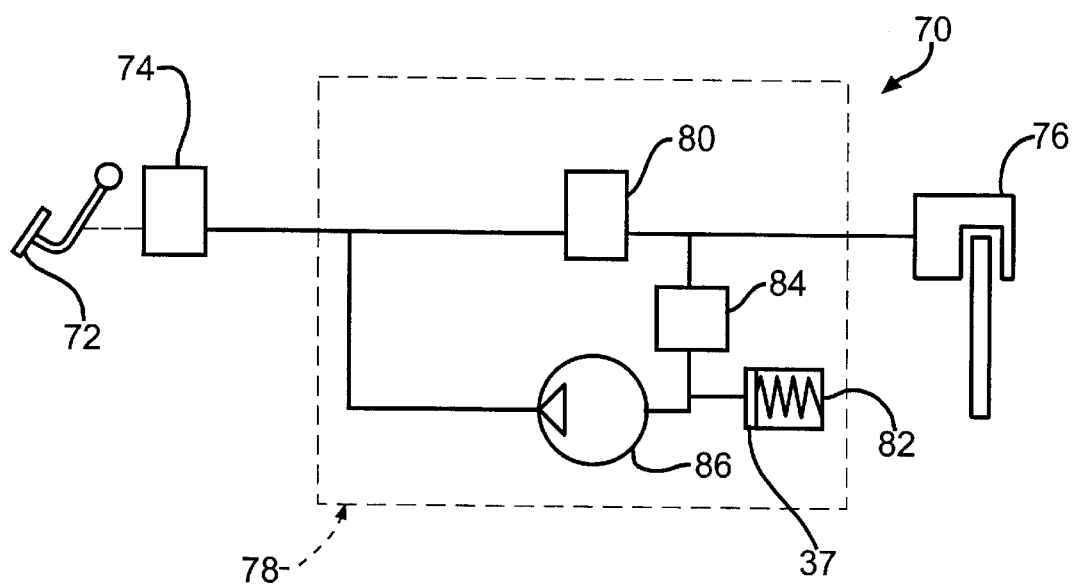
FIG. 4 is a schematic circuit diagram of a vehicle brake system according to the invention.

Referring to FIG. 4, a conventional anti-lock brake system (ABS) system is schematically illustrated generally at 70. The ABS system 70 includes a brake pedal 72 connected to a master cylinder 74 for providing pressurized brake fluid to a plurality of wheel brakes 76, only one of which is shown. The wheel brake 76 is illustrated as a disc brake, however the wheel brake 76 may be of any type found on vehicles, including a drum brake.

The brake system 70 also includes a hydraulic control unit (HCU) 78 connected in fluid communication between the master cylinder 74 and each wheel brake 76. The HCU 78 includes a housing (not shown) having bores for receiving control valves and other components, such as attenuators. Fluid conduits 20 are provided between the bores to provide fluid communication between the valves and other components. For clarity of illustration, only one set of components is illustrated in FIG. 4. Typically however, the HCU 78 also houses corresponding components for other circuits and/or wheels of the vehicle. The HCU 78 includes a normally open isolation valve 80, disposed between the master cylinder 74 and the wheel brake 76 on conduit 20. A normally closed dump valve 84 is disposed between the wheel brake 76 and a low pressure accumulator 82. A hydraulic pump 86 is connected to conduit 20 between the low pressure accumulator 82 and the master cylinder 74.

During a re-apply phase when the hydraulic pump 86 pumps fluid out of the low pressure accumulator reservoir 37, or during non-braking conditions, the spring urges the piston 30 toward the closed end 18 of the accumulator body 12 as fluid moves from the accumulator reservoir 37 to other locations in the brake system, such as the wheel brake 76. Unlike a conventional low pressure accumulator however, when the accumulator reservoir 37 is empty, the outer surfaces 48 of the ridges 46 are seated against the closed end 18 of the accumulator body 12 to prevent fluid communication between any two or more of the fluid conduits 20 through the axial bore 14 of the accumulator body 12.

The seating of the outer surfaces of the ridges 46, 50, and 52 against the closed end 18 of the accumulator body 12 prevents further fluid being pumped by the pump 86, through the low pressure accumulator 82, thereby preventing an undesirable pump-down of wheel-brake cylinder pressure if the ABS dump valve 84 is open.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A fluid accumulator comprising:

an accumulator body having an inner surface defining an axial bore extending from an open end of the accumulator body to a closed end of the accumulator body, the accumulator body further defining a plurality of fluid conduits through the closed end of the accumulator body, the fluid conduits being in fluid communication with the axial bore of the accumulator body; and a cylindrical piston having a first end surface, and a ridge extending from the first end surface, the ridge defining a cavity in the first end surface, the ridge sealing against the closed end of the accumulator body about one of the plurality of fluid conduits when the piston is urged into contact with the closed end to thereby prevent communication between the one of the plurality of fluid conduits and another of the plurality of conduits, the one of the plurality of fluid conduits being in fluid communication with the cavity defined by the ridge.

2. A piston for a fluid accumulator, comprising:

a cylindrical body having an outer surface defining a first end surface of the piston, the first end surface including a plurality of interconnected ridges, the ridges having outer surfaces and forming cavities therebetween, each ridge being adapted to provide a sealing surface between the first end surface of the piston and an inner surface of a fluid accumulator in which the piston may be inserted.

3. The piston according to claim 2 wherein the cylindrical piston body is substantially cup-shaped having an inner surface defining an axial bore extending from an open end of the piston body to a closed end of the piston body, the closed end having an outer surface, the outer surface defining the first end surface of the piston.

4. The piston according to claim 2 wherein the closed end of the piston includes a thick self-supporting wall, a thin skirt extends from the thick self-supporting wall toward the open end of the piston, and a plurality of axially extending skirt support ribs are formed on the inner surface of the piston skirt.

5. A piston for a fluid accumulator, comprising:

a substantially cup-shaped cylindrical body having an inner surface defining an axial bore extending from an open end of the piston body to a closed end of the piston body, an outer surface of the closed end defining a first end surface of the piston body, the body including a first annular ridge formed at a periphery of the first end surface, and a second annular ridge formed centrally on the first end surface, the first end surface including a plurality of third ridges extending radially from the centrally formed second annular ridge to the first annular ridge, one or more of the first, second, and third ridges defining a cavity in the first end surface of the piston body.

6. The piston according to claim 5 wherein the ridges form at least one of a substantially polygonal cavity, a substantially circular cavity, a substantially ovaloid cavity, and a substantially teardrop-shaped cavity.

7. The piston according to claim 5 wherein the closed end of the piston includes a thick self-supporting wall, a thin skirt extends from the thick self-supporting wall toward the open end of the piston, and a plurality of axially extending skirt support ribs are formed on the inner surface of the piston skirt.

8. A fluid accumulator comprising:

an accumulator body having an inner surface defining an axial bore extending from an open end of the accumulator body to a closed end of the accumulator body, the accumulator body further defining a plurality of fluid conduits through the closed end of the accumulator body, the fluid conduits being in fluid communication with the axial bore of the accumulator body; and a cylindrical piston having a first end surface, the first end surface of the piston facing the closed end of the accumulator body, the piston being slidably received within the bore of the accumulator body, the first end surface of the piston including a plurality of interconnected ridges having outer surfaces, the ridge outer surfaces being congruous with a corresponding surface of the closed end of the accumulator body when the first end surface of the piston is positioned in contact with the closed end of the accumulator body to substantially prevent fluid communication between at least one of the fluid conduits and any other of the fluid conduits through the axial bore of the accumulator body.

9. The fluid accumulator according to claim 8 wherein the cylindrical piston is substantially cup-shaped having an inner surface defining an axial bore extending from an open end of the piston to a closed end of the piston, the closed end having an outer surface, the outer surface defining the first end surface of the piston.

10. The fluid accumulator according to claim 8 wherein the interconnected ridges extend generally radially from a central portion of the first end surface, adjacent ones of the ridges defining substantially teardrop-shaped cavities therebetween.

11. The fluid accumulator according to claim 10 wherein the cylindrical piston is substantially cup-shaped having an inner surface defining an axial bore extending from an open end of the piston to a closed end of the piston, an outer surface of the closed end defining the first end surface of the piston body, the piston including a first annular ridge formed at a periphery of the first end surface, and a second annular ridge formed centrally on the first end surface, the second annular ridge defining a central recess, the central recess of the first end surface of the piston body being substantially concave.

12. The fluid accumulator according to claim 8 wherein the plurality of interconnected ridges have coplanar ridge outer surfaces forming cavities therebetween, the coplanar ridge outer surfaces sealing against the closed end of the accumulator body when the piston is positioned in contact with the closed end of the accumulator body to prevent fluid communication between at least one of the fluid conduits and any other of the fluid conduits through the axial bore of the accumulator body.

13. The fluid accumulator according to claim 12 wherein the base of each cavity is substantially flat and extends outwardly from the annular ridge, the base of each cavity being at an acute angle from a plane defined by the coplanar ridge outer surfaces of the piston.

14. The fluid accumulator according to claim 13 wherein the plane defined by the coplanar ridge outer surfaces of the piston is substantially perpendicular to a longitudinal axis of the bore of the piston body.

15. The fluid accumulator according to claim 13 wherein the base of each cavity is at an angle within the range of from about 9 degrees to about 11 degrees from a plane defined by the coplanar ridge outer surfaces of the piston.

16. The fluid accumulator according to claim 8 wherein the ridges form at least one of a substantially polygonal cavity, a substantially circular cavity, a substantially ovaloid cavity, and a teardrop-shaped cavity.

17. The fluid accumulator according to claim 8 wherein the ridge outer surfaces of the interconnected ridges cooperate to substantially define at least one of a plane and a dome shape, the ridge outer surfaces providing a sealing surface adapted to seal against the closed end of the accumulator body, the closed end of the accumulator body having a surface corresponding to the shape defined by the ridge outer surfaces of the interconnected ridges.

18. The fluid accumulator according to claim 8:
the piston being substantially cup-shaped and having an inner surface defining an axial bore extending from an open end of the piston to a closed end of the piston, the closed end of the piston having an outer surface, the outer surface defining the first end surface of the piston, the closed end of the piston having thick self-supporting wall;
a thin skirt extending from the thick self-supporting wall toward the open end of the piston; and
a plurality of axially extending skirt support ribs being formed on the inner surface of the piston skirt.

19. A piston for a fluid accumulator, comprising:
a substantially cup-shaped cylindrical body having an inner surface defining an axial bore extending from an open end of the piston body to a closed end of the piston body, the closed end of the piston having a thick self-supporting wall, a thin skirt extending from the thick self-supporting wall toward the open end of the piston, a plurality of axially extending skirt support ribs being formed on the inner surface of the piston skirt;
wherein the substantially cup-shaped cylindrical body further includes a plurality of ridges extending radially from an annular ridge formed on a central portion of an outer surface of the thick self-supporting wall, adjacent ones of the ridges defining cavities therebetween.

20. A piston for a fluid accumulator, comprising:
a substantially cup-shaped cylindrical body having an inner surface defining an axial bore extending along an axis from an open end of the piston body to a closed end of the piston body, the closed end of the piston having a thick self-supporting wall, a thin skirt extending from the thick self-supporting wall toward the open end of the piston, a plurality of axially extending skirt support ribs being formed on the inner surface of the piston skirt, each of the skirt support ribs comprising an elongated rib defining a respective surface along the length thereof, which surface faces and is generally parallel to the axis of the axial bore.

21. A fluid accumulator comprising:
an accumulator body having an inner surface defining an axial bore, the inner surface further defining a closed end of the axial bore in the accumulator body, a passage being defined through the closed end of the axial bore in the accumulator body through which the accumulator is adapted to be connected to a fluid system;
a piston disposed in the axial bore of the accumulator body, the piston including a substantially cup-shaped cylindrical body having an inner surface defining an axial bore extending from an open end of the piston body to a closed end of the piston body, the closed end of the piston body facing the closed end of the accumulator body, the closed end of the piston having a thick self-supporting wall, a thin skirt extending from the thick self-supporting wall toward the open end of the piston, a plurality of axially extending skirt support ribs being formed on the inner surface of the piston skirt; and
a spring biasing the piston toward the closed end of the accumulator body.

* * * * *